United States Patent [19]
Goldman et al.

[11] Patent Number: 5,444,634
[45] Date of Patent: Aug. 22, 1995

[54] LUBRICANT NOZZLE POSITIONING SYSTEM AND METHOD

[75] Inventors: Frank M. Goldman, Sugar Hill; Robert V. Chambers, Marietta, both of Ga.; William L. Clippard, III, Cincinnati, Ohio; Steven M. Henn, Alpharetta; William E. Otto, LaGrange, both of Ga.

[73] Assignee: Illinois Tool Works Inc., Glenview, Ill.

[21] Appl. No.: 234,119

[22] Filed: Apr. 28, 1994

[51] Int. Cl.$^6$ .................... G05B 19/00; F16N 17/00
[52] U.S. Cl. ..................... 364/474.11; 364/474.21; 184/6.1; 184/6.14
[58] Field of Search ............ 30/123, 123.3, 392, 30/393; 83/168, 169, 171; 364/474.14, 474.15, 474.2, 474.21, 474.22, 474.11; 184/6.1, 6.14, 104.1; 29/DIG. 50, DIG. 54, DIG. 63

[56] References Cited

U.S. PATENT DOCUMENTS

| | | | |
|---|---|---|---|
| 4,096,563 | 6/1978 | Slawson | 364/107 |
| 4,257,103 | 3/1981 | Suzuki et al. | 364/474 |
| 4,366,424 | 12/1982 | McKechnie | 318/568 |
| 4,484,120 | 11/1984 | Olex et al. | 318/568 |
| 4,547,854 | 10/1985 | Hashimoto et al. | 364/474 |
| 4,603,285 | 7/1986 | Matsuura et al. | 318/578 |
| 4,636,938 | 1/1987 | Broome | 364/474.22 |
| 4,700,290 | 10/1987 | Ichikawa | 364/474.22 |
| 4,739,488 | 4/1988 | Asakura | 364/474 |
| 4,807,361 | 2/1989 | Raczkowski | 30/123.3 |
| 4,813,319 | 3/1989 | Weyand, Jr. | 83/168 |
| 4,817,007 | 3/1989 | New | 364/474 |
| 5,051,675 | 9/1991 | Okumura et al. | 318/568 |
| 5,083,071 | 1/1992 | Sasaki et al. | 318/569 |
| 5,084,660 | 1/1992 | Sasaki et al. | 318/569 |
| 5,177,420 | 1/1993 | Wada et al. | 318/568 |
| 5,190,421 | 3/1993 | Wen et al. | 184/6.14 X |
| 5,193,421 | 3/1993 | Meisinger | 82/1.11 |
| 5,224,051 | 6/1993 | Johnson | 364/474.11 |
| 5,239,159 | 8/1993 | Masuda | 364/474.08 X |
| 5,243,266 | 9/1993 | Kasagami et al. | 318/568 |
| 5,246,088 | 9/1993 | Imai et al. | 184/6.14 |
| 5,257,199 | 10/1993 | Tsujino et al. | 364/474 |

Primary Examiner—Roy N. Envall, Jr.
Assistant Examiner—Brian C. Oakes
Attorney, Agent, or Firm—Schwartz & Weinrieb

[57] ABSTRACT

A lubricant nozzle positioning system and method for use with a machine tool having an automated tool changing assembly and a plurality of cutting tools secured therein, for selectively positioning a desired cutting tool to contact a workpiece to be tooled. The lubricating system includes a lubricating assembly having at least one movable nozzle for providing a desired lubricant, and a nozzle positioning subsystem for cooperation with a selected program of the automated tool changing assembly for positioning the nozzle of the lubricating assembly proximate an interface of each cutting tool and a respective portion of a workpiece to be tooled upon sequential movement of the cutting tools into position by the automated tool changing assembly according to the selected program so as to provide the lubricant as desired.

10 Claims, 3 Drawing Sheets

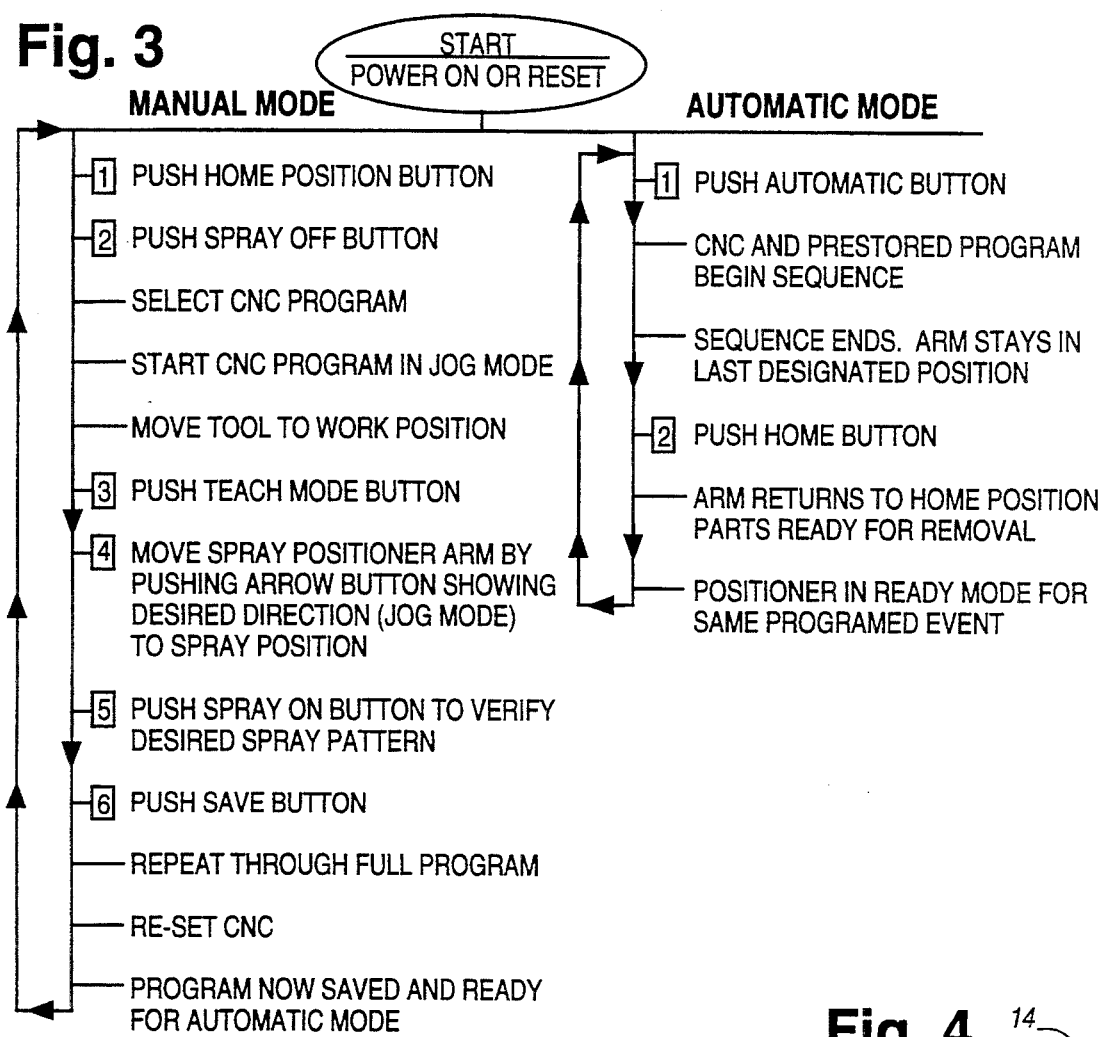
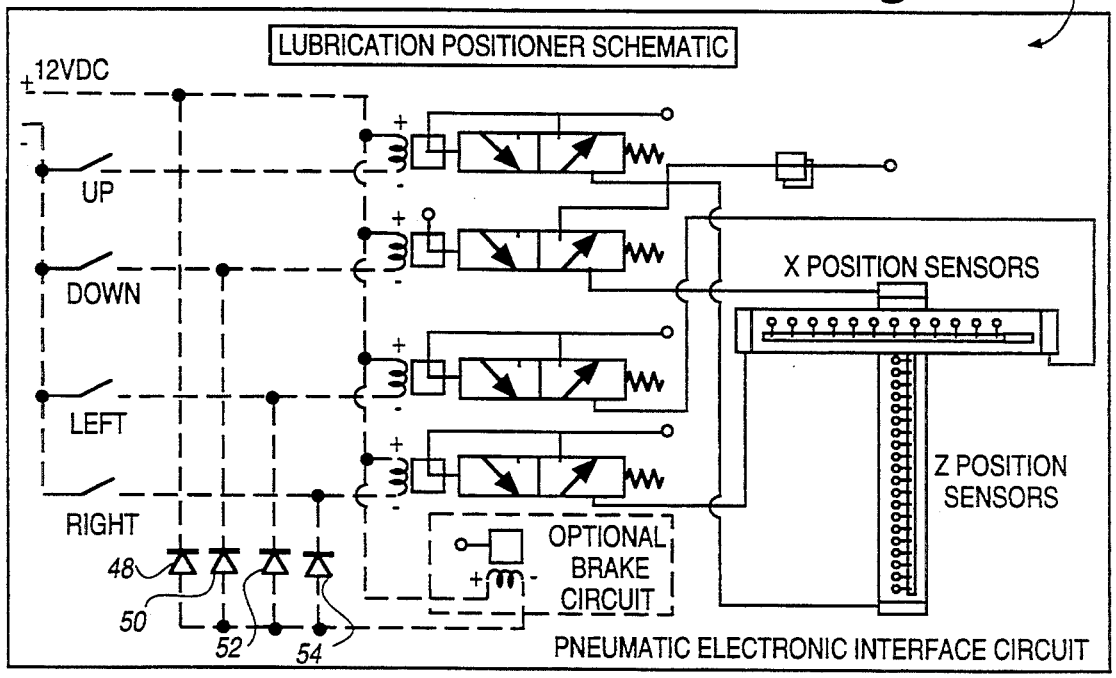

LUBRICANT NOZZLE POSITIONING SYSTEM AND METHOD

TECHNICAL FIELD

The present invention relates generally to lubricating system, and more particularly to a lubricant nozzle positioning system and method for use with a computer numeric control (CNC) machine tool which automatically positions a lubricant nozzle with respect to a variety of cutting tools positioned by the machine tool to lubricate each cutting tool as it removes material from a workpiece.

BACKGROUND OF THE INVENTION

Automated CNC machine tools typically include an apparatus for automatically changing a tool with respect to a spindle or main shaft of the machine tool. Once in place on the spindle, the spindle is activated and the tool contacts a workpiece in order to form the workpiece into a desired shape. During forming of the workpiece, the tool is typically sprayed with a lubricant from a nozzle so as to reduce the heat created by friction generated between the tool and the workpiece.

Automated tool changing apparatus include a plurality of different cutting tools stored in a magazine or tool changer assembly from which a particular tool is sequentially retrieved and transported to the spindle. Each tool typically has a different shape and is positioned in a different location with respect to the workpiece. Accordingly, the lubricant nozzle must be adjusted with respect to a particular tool to provide the lubricant in a proper position.

Lubricant is typically provided to such tools through a nozzle connected to a flexible hose member. The nozzle and hose are manually positioned each time a tool is changed, the hose being configured to substantially maintain the nozzle position when released.

Such lubricating systems, however, can be difficult to accurately position with respect to the tool and the workpiece. Additionally, the operator must manually position the nozzle which can be dangerous to the operator, particularly if the machine is in motion while the nozzle is being positioned. The flexible hose member can also be displaced from its position during machining requiring repositioning by the operator.

It therefore would be desirable to provide a lubricant nozzle positioning system and method which automatically positions a lubricant nozzle with respect to a plurality of cutting tools sequentially positioned by an automated tool changing assembly, maintains a position with a respective cutting tool during the entire machining operation, and is programmable to cooperate with a variety of automated machine tools and associated programs.

SUMMARY OF THE INVENTION

The invention provides a lubricant nozzle positioning system and method for use with a machine tool having an automated tool changing assembly with a plurality of cutting tools secured therein and which selectively positions a desired cutting tool to contact a workpiece to be tooled. The lubricant nozzle positioning system includes a lubricating assembly having at least one nozzle which is movable to provide a desired lubricant and a nozzle positioning subsystem. The subsystem cooperates with a particular program of the automated tool changing assembly and positions the nozzle of the lubricating assembly proximate an interface of each cutting tool and a respective portion of a workpiece to be tooled upon sequential movement of the cutting tools into position by the automated tool changing assembly according to the selected program so as to provide the lubricant as desired.

BRIEF DESCRIPTION OF THE DRAWINGS

Various objects, features, and attendant advantages of the present invention will be more fully appreciated from the following detailed description when considered in conjunction with the accompanying drawings in which like reference characters designate like or corresponding parts throughout the several views, and wherein:

FIG. 3 is a flow chart outlining the operation of the nozzle positioning system of the invention; and FIG. 4 is a schematic diagram of the major electrical components of the nozzle positioner of the invention.

DESCRIPTION OF THE PREFERRED EMBODIMENTS

Figure 1:
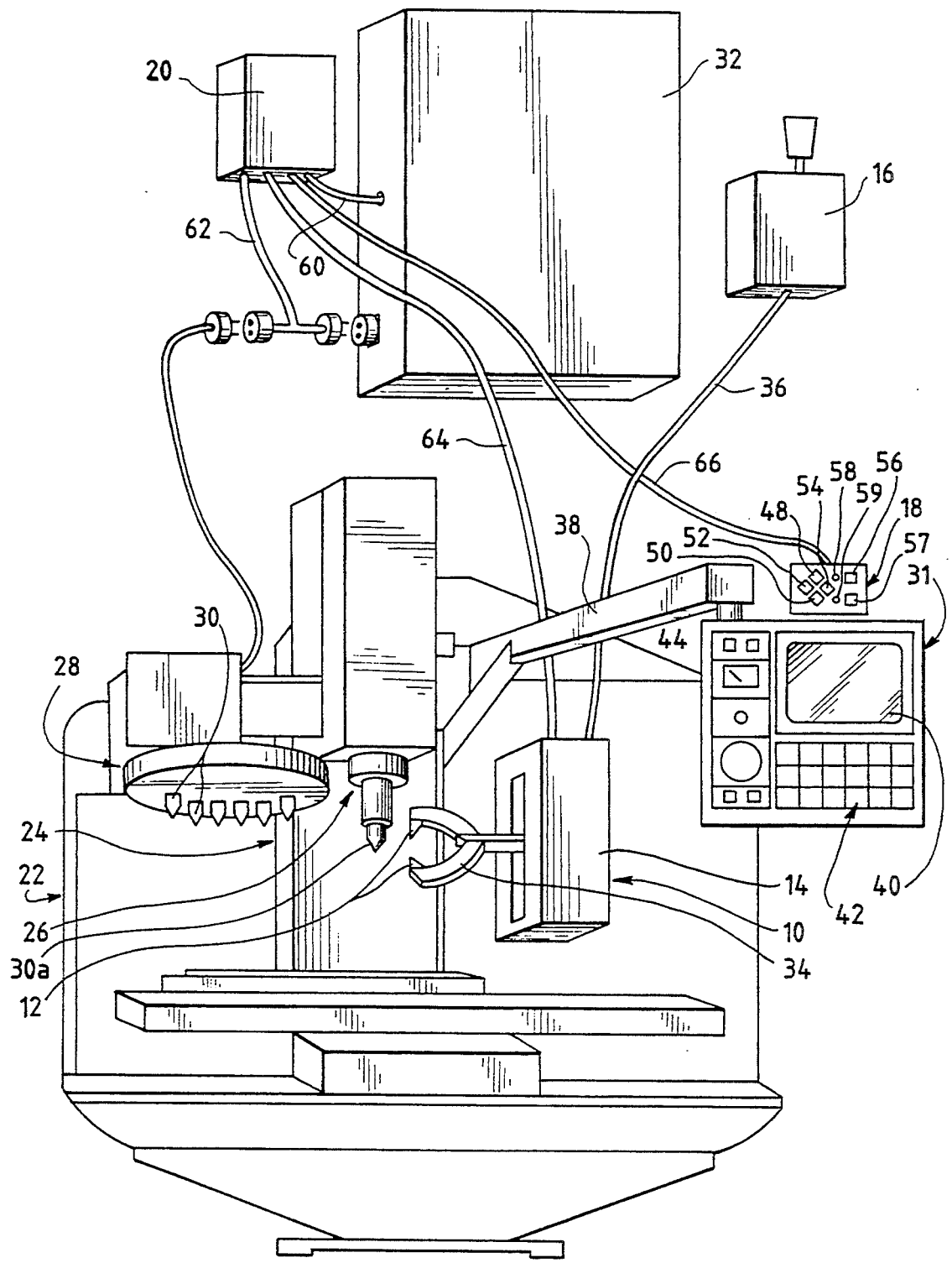
FIG. 1 is a perspective view of an automated machine tool assembly including the lubricant nozzle positioning system of the invention.

Referring to FIG. 1, the automatic nozzle positioning system of the invention is designated generally by the reference numeral 10. The system 10 substantially includes spray nozzles 12 in operable communication with a nozzle positioner 14, a lubricant supply system 16, an operator panel 18, and a control assembly 20.

The system 10 is preferably utilized with a CNC vertical machining center 22 having a machine tool 24 which includes a main spindle 26, an automatic tool changer and magazine assembly 28 having a desired number of cutting tools 30, an operator panel 31, and a control assembly 32. It is to be understood, however, that the system 10 can be utilized with a variety of machine tools or other assemblies without departing from the teachings of the present invention. Preferably, the CNC vertical machining center 22 is a Haas Model VF1 Series CNC Vertical Machining Center available from Haas Automation, Inc., Chatsworth, Calif., U.S.A.

Briefly, in operation, a workpiece (not illustrated) is positioned beneath the spindle 26 so as to be machined by a cutting tool 30, such as the cutting tool 30a positioned on the spindle 26. The control assembly 32 is programmed to rotate the spindle 26 and cutting tool 30a at a desired speed and position the cutting tool 30a and/or workpiece for contacting a precise portion of the workpiece for removing portions of the workpiece as desired.

Upon completion of the work to be performed by the cutting tool 30a, the control assembly 32 activates the tool changer assembly 28 to return the cutting tool 30a to the tool changer 28 and retrieve another cutting tool 30 therefrom for machining another portion of the workpiece. This procedure can be repeated for as many cutting or machining operations which may be required for a particular workpiece. Typically, a different program is provided for a particular workpiece which changes tools 30 and positions them in a desired sequence.

During machining, lubrication must be provided directly to the interface between the cutting tool 30a and the workpiece so as to reduce friction between those components and the heat generated by such friction. Since each cutting tool 30 is positioned at a different location on the workpiece, the point of lubrication changes with each cutting tool 30.

The system 10 of the present invention enables the nozzles 12 to be initially positioned, by an operator by use of the panel 18, to a desired position with respect to any cutting tool 30 and the workpiece. That position is assigned a desired set of coordinates for that particular cutting tool 30 and is stored in the system 10.

Once the system 10 is fully programmed by an operator to correspond to the program of the tool changer assembly 28, machining of the workpiece may begin. As a cutting tool 30 is positioned by the tool changer assembly 28 on the spindle 26, the system 10 automatically retrieves the coordinates for positioning the nozzles 12 with respect to that particular cutting tool 30 and activates the nozzle positioner 14 to position the nozzles 12 in the previously identified position. Details of the system 10 will now be provided.

Two nozzles 12 are preferably utilized and can be of any desired type so long as they function as described herein. The nozzles 12 are connected to the nozzle positioner 14 by an arm member 34 which is substantially "C"-shaped and is load compensated.

The arm 34 is moved by the nozzle positioner 14 so as to position the nozzles 12 at any desired position. The nozzle positioner 14 is connected to the vertical machining center 22 and is preferably pneumatically driven, but the particular driving mechanism of the nozzle positioner 14 can vary. The nozzle positioner 14 and associated control assembly 20 are preferably provided by Pneumatics Hydraulics & Abrasives, Inc., Marietta, Ga., U.S.A.

Figure 2:
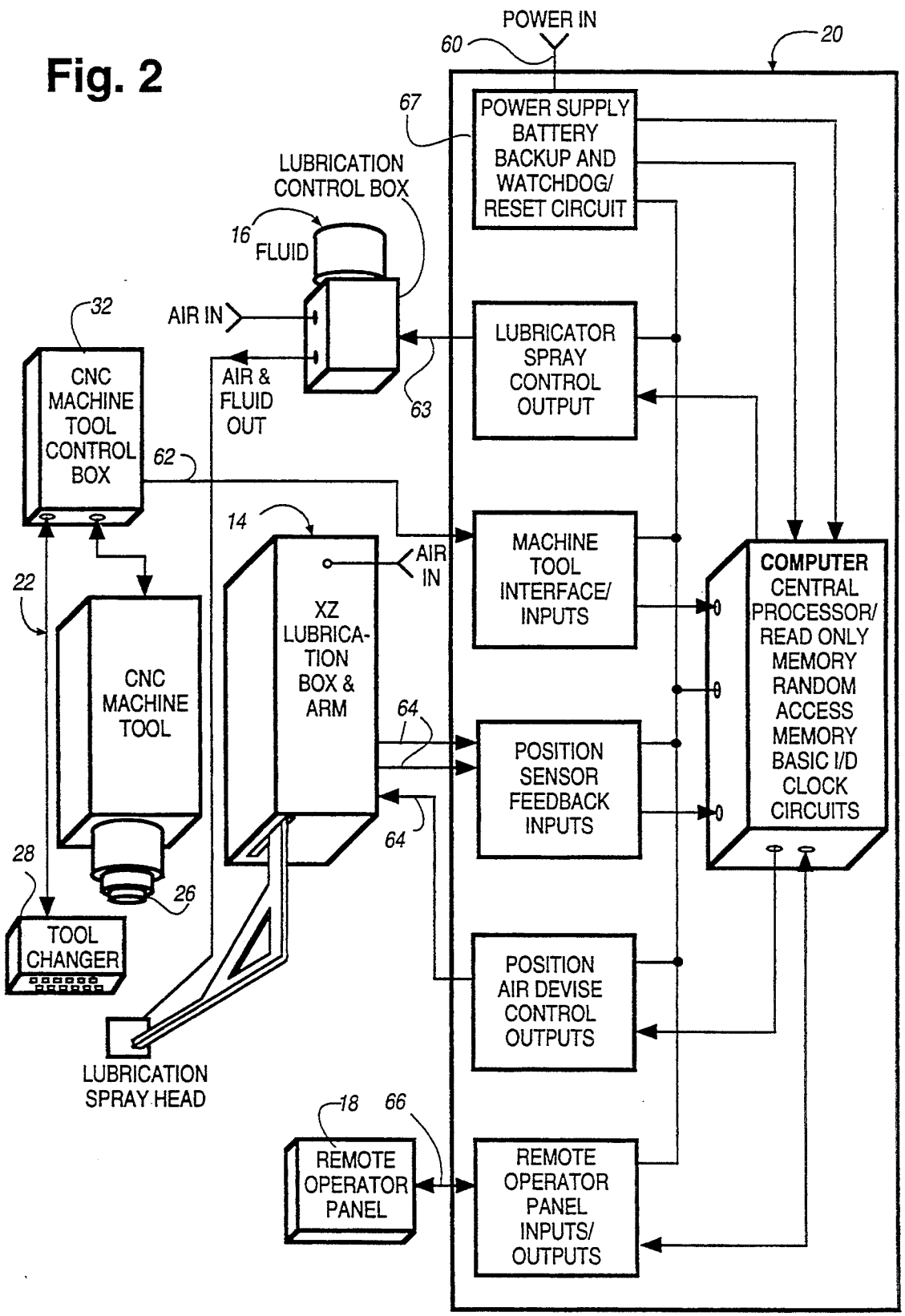
FIG. 2 is a schematic block diagram of the nozzle positioning control assembly of the invention.

With the vertical machining center 22, the spindle 26 typically only moves in the direction of the "z" axis as viewed in FIG. 2. Accordingly, the nozzle positioner 14 only provides movement of the nozzles along the "z" axis to correspond to the position of the spindle 26 and in the "x" axis to get out of the way of the spindle 26 when desired. It is to be understood, however, that the nozzle positioner 14 can provide movement of the nozzles 12 along the "y" axis or any other direction if desired.

To assist in initially positioning the nozzles 12 and provide precise repeatability, the nozzle positioner 14 preferably moves in ⅛ inch increments and is able to move back to a specific coordinate or "address" with an accuracy of ±1/16 of an inch. The particular increment can vary and movement can be continuous rather than in discrete steps, if desired.

The arm 34 and nozzle positioner 14 also provide a flow of lubricant to the nozzles 12. Preferably, the nozzle positioner 14 receives a continuous supply of lubricant from the lubricant supply system 16 through a supply hose 36 and conveys it to the arm 34.

The arm 34 includes an internal channel (not illustrated) which conveys the lubricant to the nozzles 12. The lubricant supply system 16 is preferably provided by Illinois Tool Works Fluid Products Group, Norcross, Ga., U.S.A. The lubricant utilized with the lubricant supply system 16 is preferably a vegetable oil based lubricant available under the name "Acculube" which is also provided by Illinois Tool Works Fluid Products Group, Norcross, Ga., U.S.A.

It is to be noted, however, that the particular type of lubricant supply system 16 as well as the lubricant can vary. If desired, the lubricant system 16 can be designed to recycle the lubricant with a recovery system (not illustrated).

The operator panel 18 is preferably mounted to the operator panel 31 of the vertical machining center 22 which in turn is mounted to the vertical machining center 22 by an arm 38. The operator panel 31 can include any desired controls including a display 40, keyboard 42, and a variety of meters or gauges 44. The particular layout of the operator panel 31 and the displays and controls thereon can vary.

In order for an operator to initially position the nozzles 12, the operator panel 18 includes positioning keys or buttons 48, 50, 52 and 54 for movement of the nozzles 12 along the z and x axes respectively. The operator panel 18 also includes a key 56 for setting the manual/teach and automatic modes, a save or enter key 57 for storing a desired position attained after manually positioning the nozzles 12, a key 58 for moving the nozzles 12 to a "home" position and setting coordinates to 0,0, and a key 59 for turning the flow of lubricant on or off. The particular number, types and position of keys on the operator panel 18 can vary.

As FIGS. 1 and 2 illustrate, the control assembly 20 of the nozzle positioning system 10 is provided with power by means of cable 60 and communicates with the control assembly 32 of the vertical machining center 22 by a cable 62. The control assembly 20 is also connected to the lubricant supply system 16 by a cable 63, the oil positioner 14 by a cable 64 having several lines therein, and to the operator panel 18 by a cable 66. To prevent loss of data during power outages, the control assembly 20 is backed up by a battery 67.

The control assembly 20 preferably includes electronic circuits including the components illustrated in block diagrams in FIG. 2. The computer is preferably programmable and is pre-loaded with software that interfaces directly with the control assembly 32 of the vertical machining center 22.

The software of the control assembly 20 is provided so that it does not interfere with or affect the signal outputs from the vertical machining center 22. Once programmed however, the software of the control assembly 20 automatically moves the nozzles 12 into the pre-programmed position for the particular tool 30 positioned on the spindle 26 by the tool changer assembly 28.

FIG. 3 substantially illustrates the program and operating routine provided by the system 10. The operation of the system 10 will first be described for initial start up of the vertical machining center 22 and then described during running of the vertical machining center 22.

For initial start up, power is first provided to the system 10 and pre-programming of the system 10 to correspond with a selected program of the vertical machining center 22 begins. The key 58 is depressed to move the nozzle positioner 14 to the "home" position and the x-z coordinates or "access" of the nozzles 12 is set to 0,0. The key 59 is then depressed to turn off the flow of lubricant through the nozzles 12.

A desired program for the vertical machining center 22 is then selected, and the machining center 22 is set in motion in a "jog" mode which positions a tool 30 on the spindle 26. The operator depresses key 56 to select the teach or manual mode for the system 10 and proceeds to position the nozzles 12 with the buttons 48–54. The nozzles 12 are moved in increments until the desired position is achieved with respect to the tool 30 on the spindle 26.

At that point, the operator presses the key 59 to turn on the lubricant to verify the spray pattern and then presses the save or enter key 57 on the operator panel 18 which enters the x,z coordinates of the desired position into the system 10. This process is repeated for each tool 30 provided by the particular program of the vertical machining center 22. Once the program is completed, the vertical machining center is re-set and the program of the system 10 is saved and ready for the automatic mode.

Once the program of the system 10 is provided for a particular program of the vertical machining center 22, the key 56 is pushed to activate the automatic mode, and the particular program for the vertical machining center 22 is entered which begins movement of the vertical machining center 22 and the system 10. Once the program ends, the key 58 is pressed to move the nozzles 12 to the "home position" where the workpiece can be removed.

At this point, another workpiece can be positioned so as to be machined in accordance with the same program. Alternatively, the automatic mode outlined above can be re-activated to provide a different program.

Modifications and variations of the present invention are possible in light of the above teachings. It therefore is to be understood that within the scope of the appended claims the invention may be practiced other than specifically described.

We claim:

1. A method of automatically positioning a lubricating nozzle for use with a tooling machine, comprising the steps of:

providing a tooling machine having a tooling station; and an automated tool changing assembly, having a plurality of cutting tools secured therein, for transporting a desired one of said plurality of cutting tools between a storage location defined upon said tool changing assembly and said tooling station such that a desired one of said plurality of cutting tools can contact a workpiece to be tooled when said desired one of said plurality of cutting tools is moved to said tooling station;

establishing a plurality of programs in conjunction with said automated tool changing assembly for sequentially moving particular tools of said plurality of cutting tools from said storage location to predetermined positions at said tooling station with respect to a workpiece for performing a desired machining operation upon said workpiece;

providing a lubricating assembly having at least one movable nozzle for providing a desired lubricant, and a nozzle positioning system for moving said movable nozzle;

selecting a particular one of said plurality of programs to be run in conjunction with said automated tool changing assembly to sequentially move particular tools of said plurality of tools to said tooling station; and positioning said movable nozzle, proximate an interface defined between a particular one of said plurality of cutting tools and a particular portion of a workpiece to be tooled, in to provide said lubricant to said interface conjunction with said selected one of said plurality of programs, corresponding respectively to said particular tools of said plurality of cutting tools, and in accordance with the sequential movement of said particular tools of said plurality of cutting tools into position at said tooling station with respect to said workpiece by said automated tool changing assembly in accordance with said particular one of said plurality of programs.

2. The method as defined in claim 1, further comprising the step of:

programming said nozzle positioning system, prior to said positioning of said movable nozzle, so as to provide a corresponding program for interfacing with said selected one of said plurality of programs of said automated tool changing assembly for moving said movable nozzle in conjunction with said particular tools of said plurality of cutting tools sequentially moved into position at said tooling station by said automated tool changing assembly.

3. The method as set forth in claim 2, wherein said step of programming said nozzle positioning system comprises the step of:

storing in memory positions of said movable nozzle, which correspond to positions of said particular tools of said plurality of tools when said particular tools of said plurality of tools are moved into position at said tooling station with respect to said workpiece, so as to be properly disposed with respect to said interface defined between a particular one of said plurality of cutting tools and a particular portion of said workpiece to be tooled.

4. The method as set forth in claim 3, wherein said step of storing said positions of said movable nozzle in said memory comprises the step of:

assigning to each one of said positions of said movable nozzle a set of spatial coordinates.

5. The method as set forth in claim 4, wherein said step of assigning said sets of coordinates for said positions of said movable nozzle comprises the step of:

assigning coordinate values within a three-dimensional coordinate system defined by x-y-z mutually orthogonal axes.

6. In combination, a lubrication system for use with a tooling machine, comprising:

a tooling machine having a tooling station; an automated tool changing assembly, having a plurality of cutting tools secured therein, for transporting a desired one of said plurality of cutting tools between a storage location defined upon said tool changing assembly and said tooling station such that said desired one of said plurality of cutting tools can contact a workpiece to be tooled when said desired one of said plurality of cutting tools is moved to said tooling station; and program means comprising a plurality of programs, corresponding respectively to particular tools of said plurality of cutting tools, for sequentially positioning said particular tools of said plurality of tools at specific locations at said tooling station with respect to said workpiece;

a lubricating assembly having at least one movable nozzle for providing a desired lubricant; and a nozzle positioning system for positioning said nozzle of said lubricating assembly, proximate an interface defined between a particular one of said plurality of cutting tools and a particular portion of a workpiece to be tooled to provide said lubricant to said interface, in conjunction with a particular one of said plurality of programs, corresponding respectively to said particular tools of said plurality of cutting tools, and in accordance with the sequential movement of said particular tools of said plurality of cutting tools into position at said tooling station with respect to said workpiece by said automated tool changing assembly in accordance with said particular one of said plurality of programs.

7. The combination as defined in claim 6, wherein said nozzle positioning system comprises:

programmable means for providing said nozzle positioning system with a corresponding program for interfacing with said particular one of said plurality of programs of said tooling machine for moving said movable nozzle in conjunction with said particular tools of said plurality of cutting tools sequentially moved into position at said tooling station by said automated tool changing assembly.

8. The combination as set forth in claim 7, wherein said programmable means comprises:

means for storing in memory positions of said movable nozzle, which correspond to positions of said particular tools of said plurality of tools when said particular tools of said plurality of tools are moved into position at said tooling station with respect to said workpiece, so that said movable nozzle is properly disposed with respect to said interface defined between a particular one of said plurality of cutting tools and a particular portion of said workpiece to be tooled.

9. The combination as set forth in claim 8, wherein said means for storing said positions of said movable nozzle in memory comprises:

means for assigning to each one of said positions of said movable nozzle a set of spatial coordinates.

10. The combination as set forth in claim 9, wherein said means for assigning said set of spatial coordinates comprises:

means for assigning coordinate values within a three-dimensional coordinate system defined by x-y-z mutually orthogonal axes.

* * * * *